United States Patent
Wilson, Sr.

(10) Patent No.: US 12,546,380 B1
(45) Date of Patent: Feb. 10, 2026

(54) DEVICE FOR REMOVABLY CONNECTING STRAPS TO AN OBJECT, AND A METHOD OF USING THE SAME

(71) Applicant: Tyrone Wilson, Sr., Washington, NC (US)

(72) Inventor: Tyrone Wilson, Sr., Washington, NC (US)

( * ) Notice: Subject to any disclaimer, the term of this patent is extended or adjusted under 35 U.S.C. 154(b) by 0 days.

(21) Appl. No.: 19/196,141

(22) Filed: May 1, 2025

(51) Int. Cl.
*B61D 49/00* (2006.01)
*F16G 11/02* (2006.01)

(52) U.S. Cl.
CPC .................................. *F16G 11/02* (2013.01)

(58) Field of Classification Search
CPC .......... F16G 11/02; F16G 11/03; F16G 11/08; A45F 5/10; Y10S 292/30; Y10T 29/53326; B61D 37/00; B61D 49/00
See application file for complete search history.

(56) References Cited

U.S. PATENT DOCUMENTS

| | | | |
|---|---|---|---|
| 11,497,953 B1* | 11/2022 | Naparstek | A63B 21/0552 |
| 2005/0233875 A1* | 10/2005 | Clarke | A63B 23/03525 |
| | | | 482/126 |
| 2022/0009530 A1* | 1/2022 | Alvarez | B61D 37/00 |

\* cited by examiner

*Primary Examiner* — Jun S Yoo
(74) *Attorney, Agent, or Firm* — Dunlap Bennett & Ludwig, PLLC

(57) ABSTRACT

A device for securing handles to an object is disclosed. The device includes an elastic body extending between a first end and a second end. Two handles extending from the first end in an offset stacked orientation relative to each other. A first strap and a second strap extending from the second end in an aligned arrangement relative to each other, wherein each strap has a strap slot just distal of the second end for wrapping the first and second straps around the object at an attachment point thereof. When forming this secured attachment, the first strap passes through the first strap slot and the second strap passes through the first strap slot and the second strap slot before forming the secure attachment with the attachment point.

4 Claims, 3 Drawing Sheets

DEVICE FOR REMOVABLY CONNECTING STRAPS TO AN OBJECT, AND A METHOD OF USING THE SAME

BACKGROUND OF THE SUBJECT DISCLOSURE

The present subject disclosure relates to devices for removably connecting straps to an object and, more particularly, to a process for a user to secure themselves to an object to increase steadiness during turbulence and upheaval.

From time to time, typically when traveling in a vehicle, the passenger may experience turbulence or other physical shocks resulting from unexpected or abrupt changes in direction or acceleration, wherein the passenger needs a means of steadying themselves to prevent getting hurt or damaging property. For instance, in the boating industry there are no seatbelts or safety devices for securing a person to their seat. Current seat security devices for watercraft provide a security bar and a handle which tend to fail to support the user during significant turbulence or jolts. Also, the security bar may be cold in the cold season and hot in the hot season. And if there is a seat security device it will have to be stationed in a specific location, say at a seat, which could be useless for a passenger who is standing.

As can be seen, there is a need for a method for a user to secure themselves to an object to increase steadiness during turbulence and upheaval, wherein the method embodies a device for removably connecting straps to the object.

SUMMARY OF THE SUBJECT DISCLOSURE

A device for removably connecting straps to the object is provided, wherein the device has an elastic body with one or more handles on one end of the elastic body and a unique strapping configuration on the opposing end of the elastic body. The strapping configuration is for establishing a removeable attachment point with an elongated member to allow someone to be able to secure themselves to the elongated member so that by holding the one or more handles the user improves their steadiness during turbulence as the stretchable elastic body absorbs the abrupt shocks of the turbulence. In the context of a vehicle, say a watercraft, the user can establish an attachment point with a guard rail that allows them to steady themselves when the watercraft rolls, yaws, pitches, heaves or surges. When time comes to depart the vehicle, the unique strapping can be easily removed.

In one embodiment, the subject disclosure contemplates a watercraft seat security device having a unique strapping and stretchable cord, wherein the strapping is configured to operatively associate with a guardrail of the watercraft, enabling a passenger seated in the watercraft to selectively secure themselves via the strapping configuration, wherein the stretchable elastic body absorbs the force of surges, heaves and other sudden changes of acceleration or direction through deformation.

The subject disclosure is configured to change the temperature of its one or more handles with a touch of a switch.

The subject disclosure is configured to strap to an unstrap from any object the strapping configuration can sufficiently engage and thereby includes any secured object in any setting; for instance, the handle of a door in a building experience tremors or an earthquake.

In one aspect of the present subject disclosure, a device for securing handles to an object, the device includes the following: an elastic body extending between a first end and a second end; two handles extending from the first end in an offset stacked orientation relative to each other; a first strap and a second strap extending from the second end in an aligned arrangement relative to each other; wherein each strap has a strap slot just distal of the second end for wrapping the first and second straps around the object at an attachment point thereof, wherein the first strap passes through the first strap slot and wherein the second strap passes through the first strap slot and the second strap slot before forming a secure attachment with the attachment point.

In yet another aspect of the present subject disclosure, the further includes the following: wherein each strap provides a fastener adjacent a distal end thereof, where in the secure attachment the fastener removably attached the distal end to a more proximal portion of the strap, and wherein each handle provides a temperature trigger for selectively adjusting a temperature of the handle.

In yet another aspect of the present subject disclosure, a method for securing handles to an object to increase steadiness during turbulence and upheaval includes the following: forming a secured attachment with the object by way of the aforementioned device; and forming a fastened self-engagement by removably attaching the distal end each strap of the aforementioned device to a more proximal portion of the strap.

These and other features, aspects and advantages of the present subject disclosure will become better understood with reference to the following drawings, description and claims.

DETAILED DESCRIPTION OF THE SUBJECT DISCLOSURE

Figure 1:
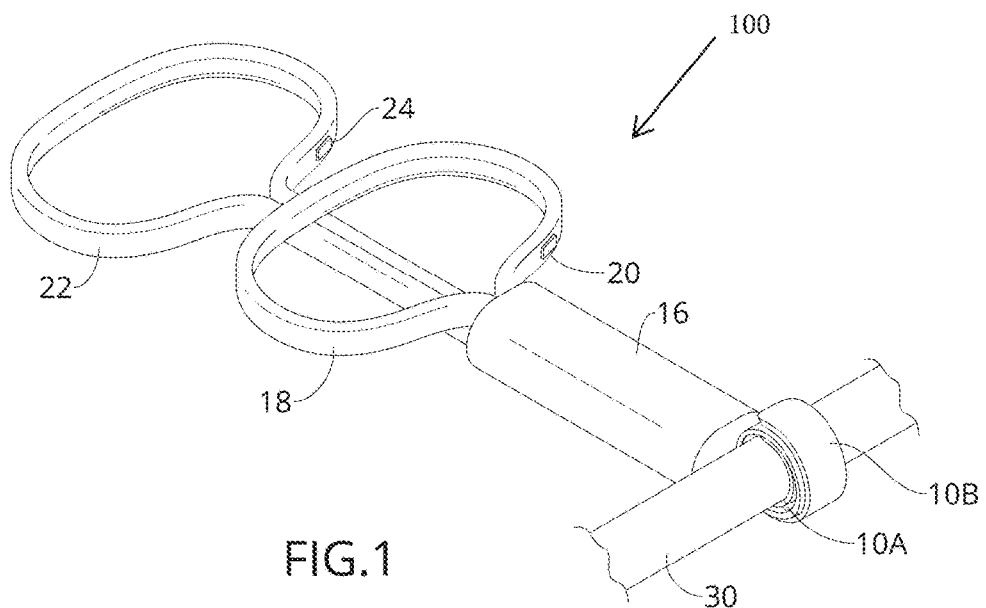
FIG. 1 is a perspective view of an exemplary embodiment of the subject disclosure.
Figure 2:
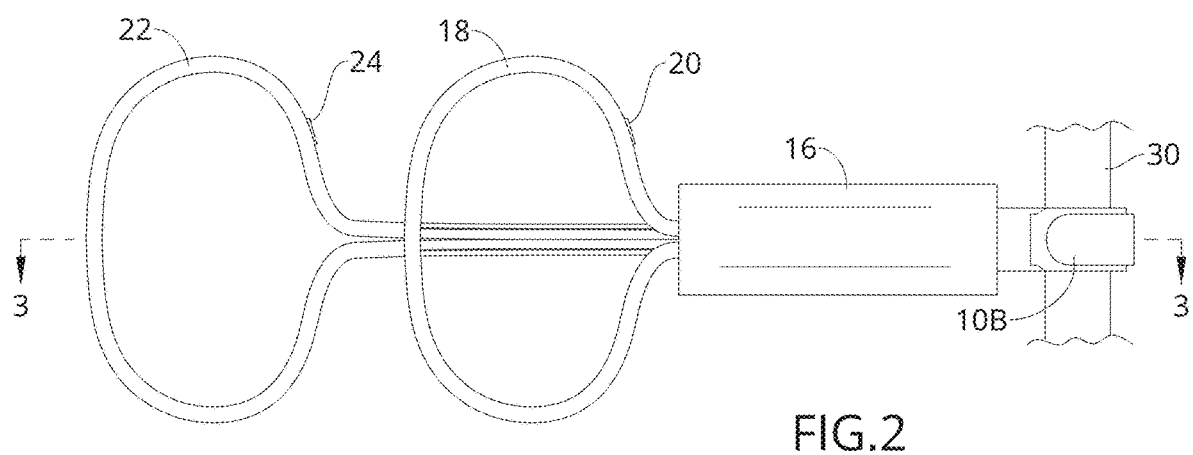
FIG. 2 is a top view of an exemplary embodiment of the subject disclosure.

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

Broadly, an embodiment of the present subject disclosure provides a securing device 100 having an elastic body 16 extending between a first end 161 and a second end 162. Connected to the first end 161 are one or more handles; in one embodiment, a first handle 18 and a second handle 22, arranged in a stacked arrangement. The first handle 18 may extend a first distance from the first end 161, while the second handle 22 extends from the first end 161 a second distance, wherein the first distance is approximately three to four inches, in one embodiment, and the second distance is approximately six to seven inches. It being understood in other embodiments, the dimensions for the first and second distances may be greater or less than those stated above.

Each handle 18 and 22 may have a loop portion and a stem portion, wherein the loop portion is distalmost from the first end 161 and the stem portion connects to the first end 161. The loop portions of the first and second handles 18 and 22 may be approximately similarly sized, wherein the stem portion of the second handle 22 is substantially longer than that of the first handle 18. In some embodiments, the first handle 18 may have a negligible or less than one-inch stem.

Figure 3:
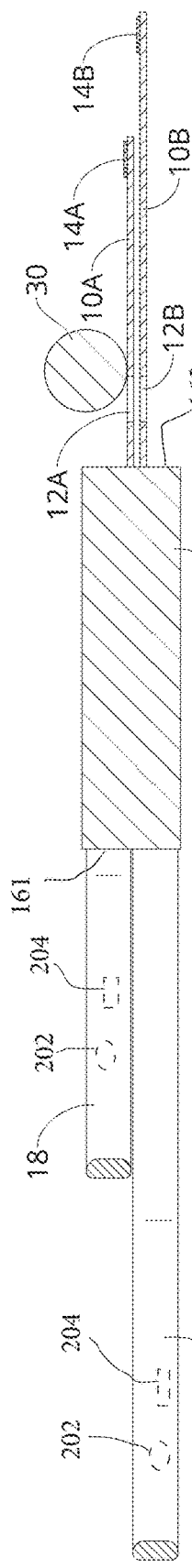
FIG. 3 is a section view of an exemplary embodiment of the subject disclosure, taken along line 3-3 in FIG. 2, illustrating initial engagement of an object 30 and the strapping configuration 10A and 10B.
Figure 4:
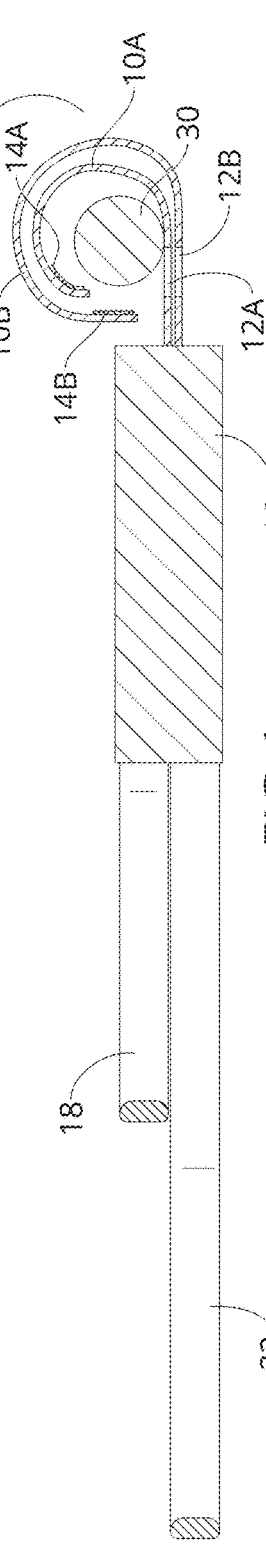
FIG. 4 is section view of FIG. 3, showing the strapping configuration 10A and 10B of the subject disclosure beginning to wrap entirely around the object 30.
Figure 5:
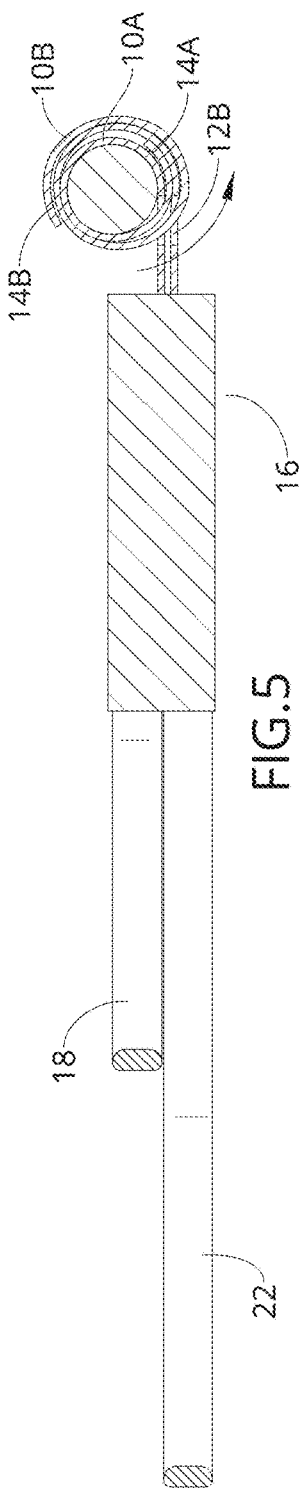
FIG. 5 is a section view of FIG. 3, showing the strapping configuration 10A and 10B of the subject disclosure moving through the strap slots forming a secured attachment between the strapping configuration and the object 30.
Figure 6:
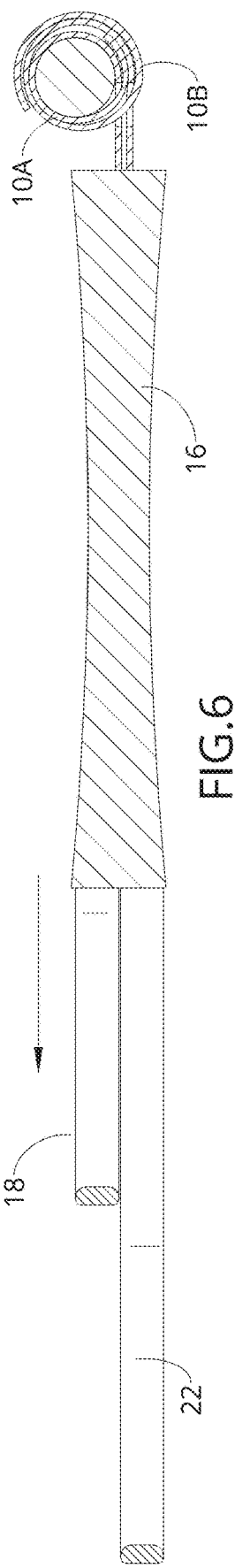
FIG. 6 is a section view of FIG. 3, illustrating the elastic body 16 deforming and thereby absorbing the force directed between the strapping configuration 10A and 10B and the handles 18 and 22.

In the stacked arrangement the first handle 18 and the second handle 22 extend along a shared longitudinal axis also shared with the elastic body 16. In the stacked arrangement the entire loop portion of the first handle 18 is offset from the looped portion of the second handle 22, making them mutually exclusive in a plan view. Each handle 18 and 22 may have a temperature trigger 20 and 24, respectively, operatively associated with a heating and cooling element (not shown) to activate such heating and cooling element to selectively control the temperature of the respective handle 18 and 22. In one embodiment, the temperature trigger 20, 24 may be electrically coupled to an internal power source 204 (e.g., battery) and heating element/heat sensor 202, see FIG. 3, configured to heat the loop portion of the loop of the respective handle 18 or 22. The loop portion may be made of a waterproof material that is flexible and heat conductive, such as cotton or the like. The temperature trigger 20 and 24 may be a silicone pop on-off button electronically hooked up to the heating element/heat sensor 202 and power source 204.

Extending from the second end 162 of the elastic body 16 are one or two straps; in one embodiment, a first strap 10A and a second strap 10B, arranged in a stacked arrangement. The two straps 10A and 10B share the longitudinal axis of the elastic body 16. The first length of the first strap 10A is approximately six inches while the second length of the second strap 10B is approximately four inches, while in other embodiments, other dimensions are possible if the first strap 10A is approximately two inches shorter than the length of the second strap 10B. At the distal end of each strap 10A and 10B is a strap detachable fastener 14A and 14B, respectively. The detachable fastener 14A and 14B may be but are not limited to hook and loop fastening portions that enable each strap 10A and 10B to form a fastened self-engagement with itself.

Each strap 10A and 10B provides a strap slot 12A and 12B, respectively, just distal of the second end 162. In use, the first strap 10A goes through the first strap slot 12A and the second strap 10B goes through both first strap slot 12A and second strap slot 12B.

Figure 7:
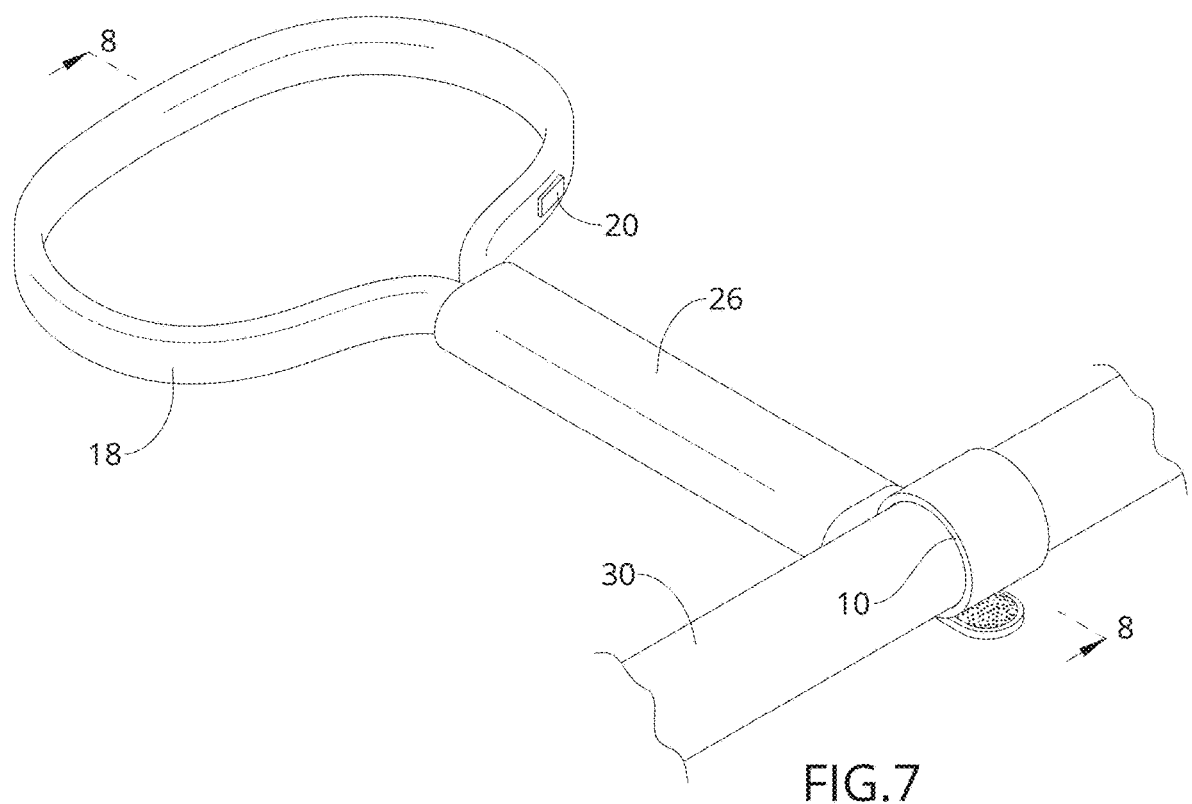
FIG. 7 is a perspective view of an exemplary embodiment of the subject disclosure having one handle 18 and a one-strap strapping configuration.
Figure 8:
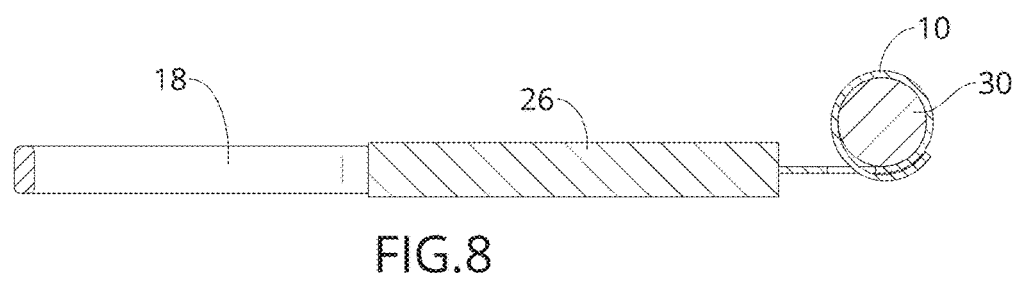
FIG. 8 is a section view of an exemplary embodiment of the subject disclosure, taken along line 8-8 in FIG. 7.

Referring to FIGS. 7 and 8, the watercraft seat securing device 100 may have only one strap 10 and one handle 18 extending from opposing ends of an elastic body 26.

Referring to FIGS. 3 through 6, in operation, a user would find an object 30, possibly an elongated member (such as a guardrail of the watercraft) to establish an attachment point with the first and second straps 10A and 10B. The attachment point to the object 30 is achieved by forming a secured attachment therewith through wrapping the first and second straps 10A and 10B around the object 30 after the respective distal ends of the first and second straps 10A and 10B are slid through their respective strap slot 12A and 12B. Whereby the two straps 10A and 10B are cinched around the object 30 to form the secure attachment with the attachment point of the object 30. Then the cinched engagement/secured attachment is further enhanced by attaching the first and second fasteners 14A and 14B to their respective straps, thereby forming the fastened self-engagement.

Once the attachment point has been established, the flexible, bungee-like stretchable elastic body 16 absorbs abrupt shocks to a user gripping the first and second handles 18 and 22, through deformation, wherein the stretch of an inch to a foot or more of the elastic body 16 dissipates the energy, thereby lessening the impact the user experiences.

The temperature of the handles 18 and 22 of the securing device 100 can be selectively controlled through engaging one or both temperature triggers 20, 24.

The securing device 100 can be made with material that can be sewn in a circle or loop portion to make a handle grip, and it can be sewn on a fabric that may cover the elastic material of the body 16, 26. The other end will have two straps with a hole at the beginning of the strap and closing fastener on the other end with, in some embodiments, hook and loop portions sewn therein. Nylon rope straps materials could make up the elastic body 16 as could bougie cords, springs, nylon and cotton material or other elastic material. Thereby the user can strap it down and use it as a safety device whenever anticipating unexpected shocks, surges or upheavals. Additionally, the securing device 100 can be very easily removed/detached via the strapping configurations use of self-slots and self-engagement fasteners so that the straps 10A and 10B need not crisscross, but rather always stay in alignment in their stacked arraignment even though they wrap around object 30. In the context of a vehicle, any appropriately sized object can be used to steady the user of the subject disclosure through forming a secured attachment therewith so that as the user grips the handles 18 or 18 and 22, the elastic body deforms a foot or several inches to absorb shocks.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the subject disclosure and that modifications may be made without departing from the spirit and scope of the subject disclosure as set forth in the following claims.

What is claimed is:

1. A device for securing handles to an object, the device comprising:
    an elastic body extending between a first end and a second end;
    two handles extending from the first end, away from the second end, in an offset stacked orientation relative to each other;
    a first strap and a second strap extending from the second end, away from the first end, in an aligned arrangement relative to each other; and
    wherein each strap has a strap slot just distal of the second end for forming a secure attachment with an attachment point of the object through wrapping the first and second straps around the object at said attachment point so that the first strap passes through the first strap slot and wherein the second strap passes through the first strap slot and the second strap slot.

2. The device of claim 1, wherein each strap provides a fastener adjacent a distal end thereof, where in the secure attachment the fastener is removably attachable to a more proximal portion of the strap, whereby a fastened self-engagement is established.

3. The device of claim 1, wherein each handle provides a temperature trigger for selectively adjusting a temperature of the handle.

4. A method for securing handles to an object, the method comprising:
    forming a secure attachment with the object by way of a device of claim 2; and
    establishing a fastened self-engagement with said device, for each strap, by removably attaching the fastener of the strap to the more proximal portion of the strap.

* * * * *